United States Patent
Ortega Garcia et al.

(10) Patent No.: US 10,099,632 B1
(45) Date of Patent: Oct. 16, 2018

(54) INTEGRATED BRACKET FOR TRIM RING REINFORCEMENT

(71) Applicant: Ford Global Technologies, LLC, Dearborn, MI (US)

(72) Inventors: Edgar Javier Ortega Garcia, Tlalnepantla (MX); Allan Alberto Mejia Jaramillo, Atizapan de Zaragoza (MX); Gabriel Ortiz Vega, Mexico City (MX); Julian Lopacki, Holly, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/633,890

(22) Filed: Jun. 27, 2017

(51) Int. Cl.
*B60R 13/02* (2006.01)
*B60R 11/02* (2006.01)
*B60R 16/02* (2006.01)
*B60R 11/00* (2006.01)

(52) U.S. Cl.
CPC ...... *B60R 13/0231* (2013.01); *B60R 11/0217* (2013.01); *B60R 16/0215* (2013.01); *B60R 2011/0028* (2013.01); *B60R 2011/0047* (2013.01); *B60R 2013/0287* (2013.01)

(58) Field of Classification Search
CPC ............. B60R 13/0231; B60R 11/0217; B60R 2013/0287

USPC ....................... 296/214, 39.1, 1.08
See application file for complete search history.

(56) References Cited

U.S. PATENT DOCUMENTS

| | | | |
|---|---|---|---|
| 6,318,797 B1 * | 11/2001 | Bohm | B60R 13/0212 296/208 |
| 6,377,695 B1 | 4/2002 | Azima et al. | |
| 6,523,887 B1 * | 2/2003 | Picken | B60R 13/025 280/730.2 |
| 6,669,278 B2 | 12/2003 | Patelczyk et al. | |
| 8,100,466 B2 | 1/2012 | Leroy et al. | |
| 8,103,041 B2 * | 1/2012 | Koch | B60R 11/0217 381/386 |
| 2013/0174974 A1 * | 7/2013 | Schumacher, Jr. | B64C 1/14 156/242 |
| 2014/0333097 A1 * | 11/2014 | Kring | B60R 13/0225 296/214 |
| 2015/0014971 A1 * | 1/2015 | Zucal | B60R 21/2165 280/730.2 |

* cited by examiner

*Primary Examiner* — Dennis H Pedder
(74) *Attorney, Agent, or Firm* — Vichit Chea; Brooks Kushman, P.C.

(57) ABSTRACT

A trim component for a vehicle is provided. The trim component may include a trim panel, a backing layer, and a speaker. The trim panel may have tapered sidewalls extending from a trim reinforcement, offset from a periphery of the opening and terminating at an edge. The backing layer may be disposed along a first surface of the trim panel and wrapping around the edge to define a trim ring. The speaker may be attached to a second surface of the trim panel and spaced outwardly from the trim ring.

10 Claims, 4 Drawing Sheets

INTEGRATED BRACKET FOR TRIM RING REINFORCEMENT

TECHNICAL FIELD

This disclosure relates to attachment features for mounting a speaker to a vehicle roof trim panel.

BACKGROUND

Headliners are vehicle panels that are coupled to a support structure or roof of a vehicle. Headliners may include one or more peripheral edges that are visible to an occupant within the vehicle. In certain applications, it may be desirable to provide one or more of these edges with a finished appearance so as to improve the aesthetics within the vehicle for the vehicle occupant. It may also be desirable to integrate interior vehicle components such as speakers into the peripheral edge of the headliner. As sunroofs increase in size (e.g., panoramic sunroofs, etc.), there is less and less headliner material surrounding them, which may lead to a decrease in space to attach the speakers. In certain vehicles, the support structure or roof may have a curved, non-planar shape, or non-uniform shape. Such speaker brackets are generally manufactured separately and are uniquely designed to mount to the each of the speaker brackets to different locations of the vehicle roof panel.

Integrating one or more speaker brackets within or near a peripheral edge of the headliner may decrease the space required to mount the speaker brackets. Moreover, the integration of the speaker bracket within the headliner may allow the same speaker brackets to be mounted to a non-planar or non-uniform portion of the vehicle roof panel.

SUMMARY

According to one embodiment of this disclosure, a trim component for a vehicle is provided. The trim component may include a trim panel, a backing layer, and a speaker. The trim panel may have tapered sidewalls extending from a trim reinforcement, offset from a periphery of the opening and terminating at an edge. The backing layer may be disposed along a first surface of the trim panel and wrapping around the edge to define a trim ring. The speaker may be attached to a second surface of the trim panel and spaced outwardly from the trim ring.

According to another embodiment of this disclosure, a vehicle roof is provided. The vehicle roof may include a roof panel having a sunroof opening, a trim panel, and a backing. The trim panel may be disposed around the opening and include tapered sidewalls extending from the panel towards the opening to an edge. The backing may be folded over the edge to define a trim ring and the trim panel may include a speaker attachment aperture that may be spaced away from the trim ring.

According to another embodiment of this disclosure, a trim component for a vehicle sunroof opening. The trim component may include a trim panel, a backing layer, and a protrusion. The trim panel may surround the opening and have a wall extending towards the opening to define an edge. The backing layer may be disposed along a first surface of the trim panel and wrap around the edge to define a trim ring. The protrusion may define an aperture sized to receive a speaker extending from and angled away from the trim panel.

The trim panel may define an aperture and the second surface may include at least two protrusions that partially extend within the aperture and they may be configured to attach the speaker.

The at least two protrusions may be bosses that define a fastener attachment hole and the fastener attachment hole may be configured to receive a fastener to attach a speaker to the boss.

The tapered sidewalls may define an inner radius that extends along an inner periphery of the trim panels and the inner periphery may define a first plane and the trim reinforcement may define a second plane that is angled away from the first plane.

The trim reinforcement may also define an aperture that is sized to receive a fastener for a wire harness connector.

The trim reinforcement may include a weakened section that is disposed between the trim reinforcement and the tapered sidewalls wherein the weakened section is configured to break in response to a predetermined force.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Trim components are often used in vehicles to conceal certain edges or portions of a vehicle components that may be unsightly to an occupant. One such trim component extends around a moonroof or sunroof opening within a vehicle roof. The trim component may include a wrapped edge that extends below and inwardly of the sunroof or moonroof opening. This trim component may serve several purposes including but not limited to holding the headliner cloth against the headliner foam as well as concealing the inner periphery of the sunroof or moonroof opening. The trim component may include a trim reinforcement that is a planar plastic portion that extends around the moonroof opening that is designed to fit flush against the vehicle roof. A tapered sidewall may extend inwardly from the trim reinforcement past the inner periphery of the sunroof or moonroof opening. The tapered sidewall may include an edge wrapped portion that is wrapped around the tapered sidewall so that it provides a finished or "Class-A" surface.

The trim reinforcement may also include apertures or speaker attachment holes as well as various attachment features for mounting a speaker to the trim reinforcement. Integrating these holes and attachment features allows a speaker to be mounted to the trim reinforcement of the trim component. The trim reinforcement may be angled at various degrees so that the same trim component may be used for various vehicles. The trim reinforcement may also include a weakened or perforated section so that the speaker attachment portion may be removed should a speaker not be mounted in that location.

Figure 1:
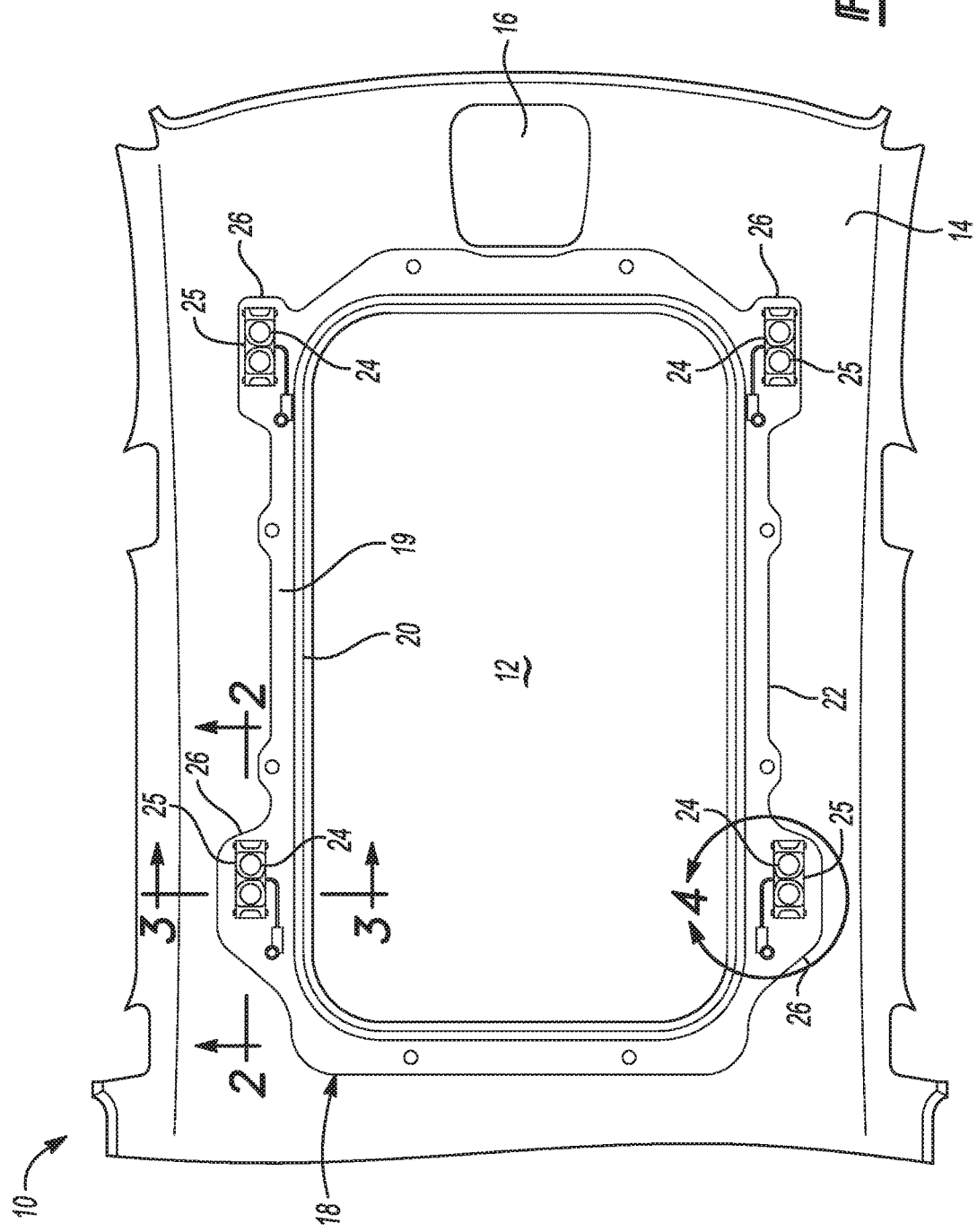
FIG. 1 is a bottom view of a vehicle roof assembly including a trim ring reinforcement with integrated speaker brackets.

Referring to FIG. 1, a bottom view of a vehicle roof 10 is illustrated. The vehicle roof 10 includes a sunroof or a moonroof opening 12 that is disposed rearward of the overhead console 16. Automotive sunroofs or moonroofs are generally a fixed or operable (venting or sliding) opening in the vehicle roof that allows light, or fresh air, or both, to enter the passenger compartment. The sunroof 12 may be manually operated or motor driven and may have many shapes, sizes and styles. The vehicle roof 10 may include a trim component 18 that surrounds a periphery of the sunroof 12. The trim component 18 may sandwich or hold up the headliner foam 14 against the vehicle roof 10. The headliner foam may be covered by a headliner cloth (not shown) or by other suitable means.

The trim component 18 may include one or more edges (e.g., peripheral edges, internal edges, etc.) that include a folded-over or wrapped edge. The folded-over or wrapped edges may be provided for aesthetic purposes and/or functional purposes. For example, the folded-over or wrapped edges may function as a reinforcement member that improves the strength and/or rigidity of the vehicle panel. The folded-over or wrapped edge may also prevent creases from propagating from the edge and further help to reduce the chance of fabric fraying along an edge. The vehicle sunroof 12 may be disposed between the overhead console 16 and the rear dome light 15. The headliner 14 may include additional openings (e.g., for a second sunroof, for an attachment opening, etc.) or may be a substantially continuous panel without any openings.

The trim component 18 may be made from multiple layers including but not limited to a core of thermoset material, a thermoplastic adhesive, and a backing layer. The core may include one or more light weight material layers that may be porous or non-porous. For instance, a layer may be made from a polymer that irreversibly cures like a thermosetting polyurethane material layer like a polyurethane foam. One or more reinforcement mats, such as fiberglass mats, may be laminate to or at least partially embedded in the polyurethane material layer. A trim reinforcement 19 is a portion of the trim component 18 that extends around the edge wrap portion 20. The trim reinforcement may be comprised of a plastic or polymeric material, metal, composite material, or other suitable material. The trim reinforcement 19 may include a tapered sidewall 22 that extends to an edge 21 towards the opening 12 within the vehicle roof (FIG. 3).

The trim component 18 may include a number of protrusions 26 that are spaced apart from the trim ring or edge wrap portion 20. The protrusions 26 may extend outside of the planar peripheral portion 22 and they may include a number holes or apertures. The holes or apertures within the protrusions 26 are sized to receive a speaker 24. While they are shown as being elongated and extending along a length of the trim component 18, they may have a number of different shapes and sizes. Because the shape of the roof may vary from vehicle to vehicle the protrusions may be angled away from a plane defined by the edge wrap.

Figure 2:
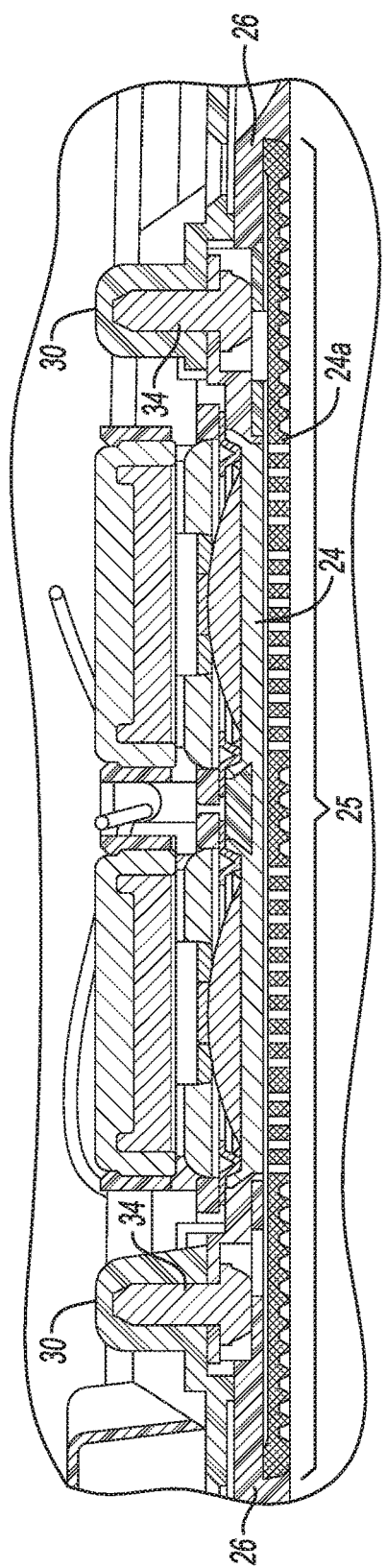
FIG. 2 a cross-sectional view along the lines 2-2 of FIG. 1.

Referring to FIG. 2, a cross-sectional view taken along the lines 2-2 in FIG. 1, is illustrated. The cross-sectional view is taken across a longitudinally extending line through the speaker attachment hole or aperture 25. Within the hole or aperture 25, two protrusions extend partially within the hole or aperture 25. Bosses 30 extend from the protrusions and may include a fastener attachment hole 32. The speaker 24, including the speaker cover 24a and a speaker bracket 24b may be fastened by a fastener 34 to the fastener attachment hole. While the speaker 24 is attached via a threaded fastener, other suitable fastening mechanisms may be utilized. For example, the nut and bolt, self-tapping fastener, adhesive, or a hook-and-loop fastener may be utilized. The speaker 24 and speaker attachment hole 25 are each disposed within the trim reinforcement 19.

Figure 3:
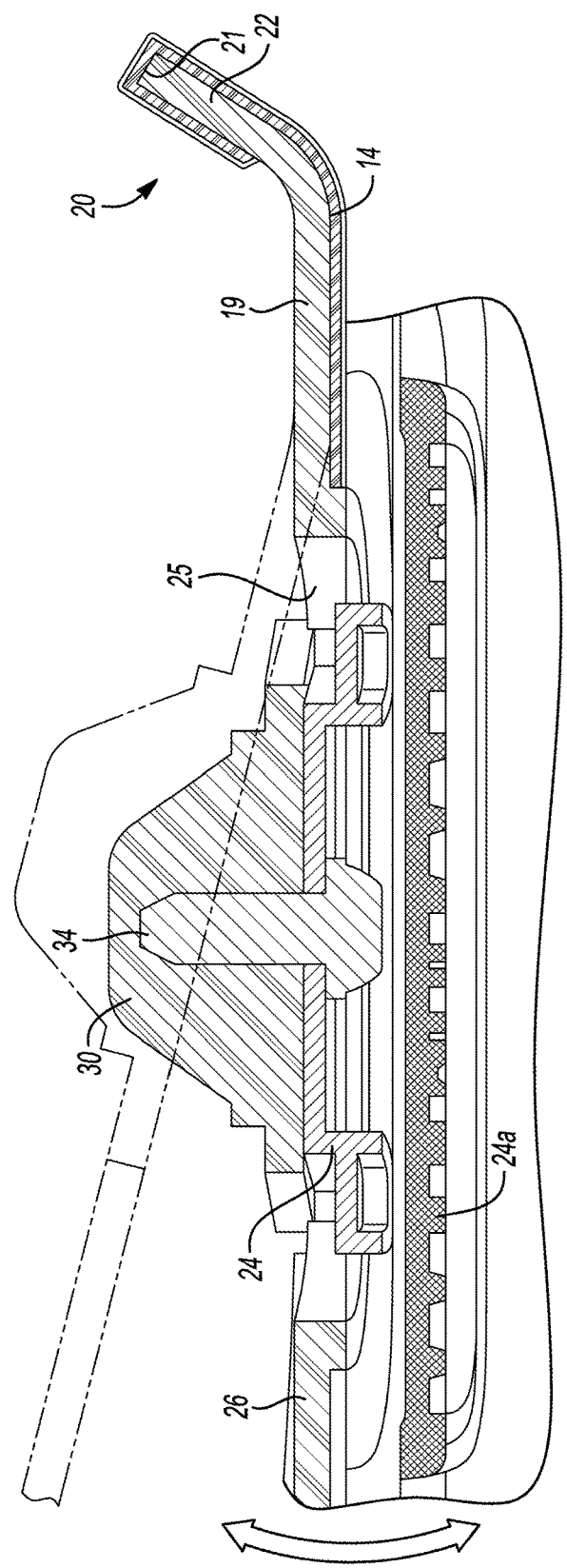
FIG. 3 is a cross-sectional view taken along the lines 3-3 of FIG. 1.

Referring to FIG. 3, a cross sectional view take along lines 3-3 in FIG. 1, is illustrated. The cross-sectional view is taken across the transversely extending line through the speaker attachment hole or aperture 25. One of the bosses, 30 extends within the hole or aperture 25. A speaker 24 is attached to the boss 30 by a mechanical fastener 34 that sandwiches the speaker 24 up against the boss 30. The speaker 24 and speaker attachment hole or aperture 25 is spaced apart from the edge wrap 20. The sunroof or moonroof opening 12 (FIG. 1) is now shown in this illustration but would be positioned to the right of the edge wrap portion 20. Though the speaker attachment hole 25 and speaker 24 are oriented along a plane that is orthogonal to the roof opening 12, the speaker attachment hole 25 and speaker 24 may be oriented downwards or upwards with respect to the roof opening 12.

It should be appreciated that the edge wrap 20 and tapered side wall may extend in the opposite direction shown in FIG. 3. Meaning the reinforcement 19 may be positioned on along the same surface that the speaker attachment hole 25 is disposed on. The plastic surface shown above the reinforcement 19, shown in FIG. 3, may be positioned below the reinforcement 19. That same plastic surface may extend around the tapered sidewall in the opposite direction.

Figure 4A:
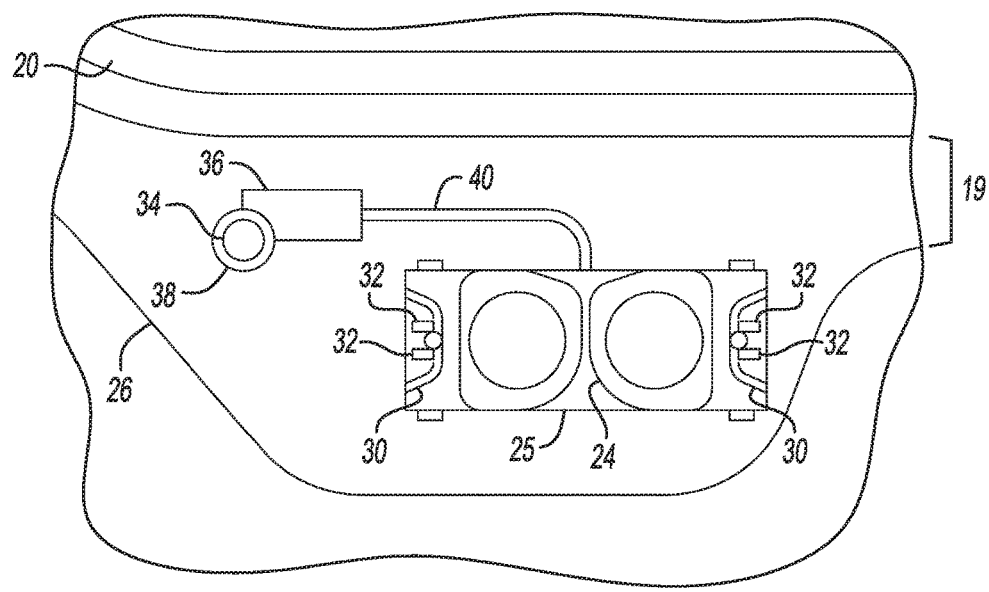
FIG. 4A is a top detailed view of the integrated speaker bracket circled by line 4 in FIG. 1.

Referring to FIG. 4A, a detailed view circled by line 4 in FIG. 1 is illustrated. The detailed view is a top view of the protrusion 26 extending from the trim reinforcement 19. The protrusion includes a speaker attachment hole or aperture 25 that may receive the speaker 24. The speaker attachment hole 25 may be spaced apart from the edge wrap 20 and reinforcement bracket 19. By spacing the speaker attachment hole 25 away from the edge wrap 20 and reinforcement bracket, the protrusion may be angled at various configurations so that it is suitable for multiple vehicle roof panels. One or more bosses 30 may extend from a portion of the protrusion 26 within the aperture or speaker hole 25. The speaker 24 may be pressed against the bosses 30 and a fastener 34 (FIG. 2) may be screwed into the bosses 30 to clamp the speaker 24 to the trim component 18. Reinforcement ribs 32 may be formed within the boss or a portion of the protrusion. The reinforcement ribs 32 may be formed to resist bending or force associated with attaching the speaker to the trim component. In other embodiments, the reinforcement ribs 32 may be recessed and configured to act as an anti-rotation feature to prevent rotation of the speaker 24 as the fastener 34 is driven.

The speaker 24 may receive electrical current to power the speaker 24 through the connector 36 and wire 40. The connector may be held in place by a connector fastener 34 that is attached to the connector attachment hole 38. After assembling the speaker and connector to the trim component 18, the connector 36 may be plugged in to a wire harness or a wiring loom (not shown) that may be in turn, electrically connected to a power source and a controller (not shown).

Figure 4B:
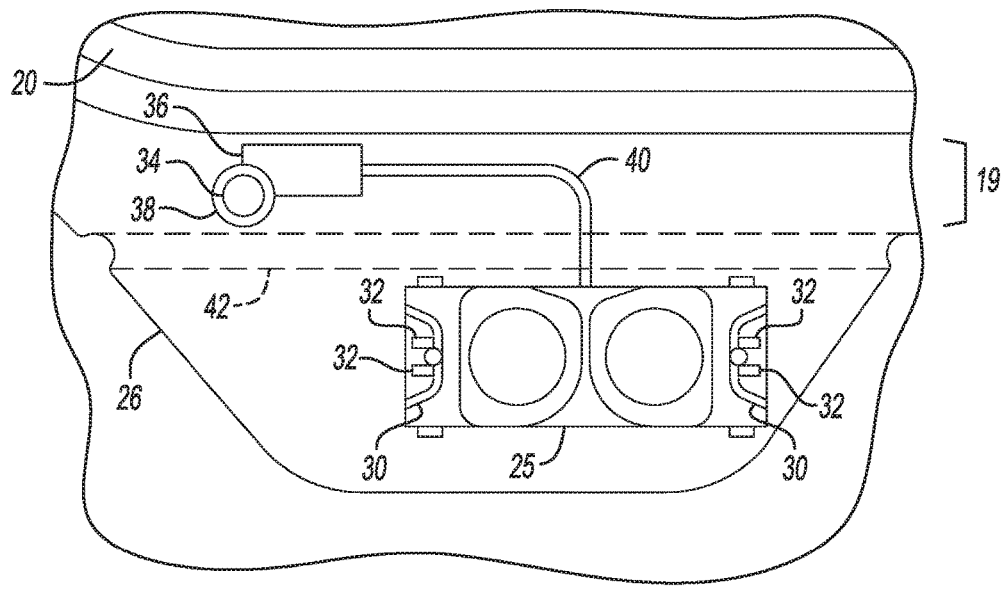
FIG. 4B is a top detailed view of the integrated speaker bracket circled by line 4 in FIG. 1, according to another embodiment of this disclosure.

Referring specifically to FIG. 4B, a top detailed view of the integrated speaker bracket circled by line 4 in FIG. 1, according to another embodiment of this disclosure, is illustrated. The integrated speaker 24 and protrusion 26 is nearly identical to the integrated speaker and 24 and protrusion 26 described above, with one exception. In this embodiment, the protrusion 26 is connected to the reinforcement bracket by a weakened section 42. The weakened section facilitates the removal of the protrusion should the vehicle not need that particular speaker mounting location. By allowing the removal of the protrusion and associated speaker attachment features, the same trim component 18 may be utilized for a larger number of vehicles. Utilizing the same component across several vehicle lines may decrease the complexity of the design and increase economies of scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A trim component for a vehicle sunroof opening:
   tapered sidewalls extending from a trim reinforcement, positionally offset from a periphery of the opening, and terminating at an edge;
   a backing layer disposed along a first surface of the trim reinforcement and wrapping around the edge to define a trim ring; and
   a speaker attached to a protrusion extending from and angled obliquely away from the trim reinforcement, wherein the protrusion is connected to the trim reinforcement by a weakened section.

2. The trim component of claim 1, wherein the weakened section is configured to break in response to a predetermined force.

3. A vehicle roof comprising:
   a roof panel having a sunroof opening;
   a trim reinforcement disposed around the opening having sidewalls extending from the panel towards the opening to an edge;
   a backing folded over the edge to define a trim ring; and
   a protrusion, extending and obliquely angled away from the trim reinforcement defining an aperture that receives a speaker, and wherein the protrusion is connected to the trim reinforcement by a weakened section.

4. The vehicle roof of claim 3, wherein the speaker is fastened to at least one projection extending within the aperture.

5. The vehicle roof of claim 4, wherein the at least one projection includes a boss defining a fastener attachment hole.

6. The vehicle roof of claim 4, wherein the weakened section is configured to break in response to a predetermined force.

7. A trim component for a vehicle sunroof opening:
   a trim reinforcement surrounding the opening and having a wall extending towards the opening to define an edge;
   a backing layer disposed along a first surface of the trim reinforcement and wrapping around the edge to define a trim ring; and
   a protrusion extending and angled away from the trim reinforcement, connected by a weakened section, and defining an aperture sized to receive a speaker.

8. The trim component of claim 7, wherein the weakened section is configured to break in response to a predetermined force.

9. The trim component of claim 7, wherein the protrusion includes a boss defining a fastener attachment hole.

10. The trim component of claim 7, wherein the reinforcement further defines an aperture sized to receive a fastener for a wire harness connector.

* * * * *